(12) United States Patent
Tsutsumi et al.

(10) Patent No.: US 8,887,893 B2
(45) Date of Patent: Nov. 18, 2014

(54) WORK SYSTEM

(75) Inventors: Ryosuke Tsutsumi, Kitakyushu (JP);
Hiroaki Murakami, Kitakyushu (JP);
Yoshihisa Nagano, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 126 days.

(21) Appl. No.: 13/339,426

(22) Filed: Dec. 29, 2011

(65) Prior Publication Data

US 2012/0217129 A1    Aug. 30, 2012

(30) Foreign Application Priority Data

Feb. 25, 2011   (JP) .................................. 2011-040613

(51) Int. Cl.
*B23Q 7/08*   (2006.01)
*B25J 9/00*   (2006.01)
*B23P 21/00*   (2006.01)

(52) U.S. Cl.
CPC .............. *B25J 9/0093* (2013.01); *B25J 9/0096* (2013.01); *B23P 21/004* (2013.01); *Y10S 901/16* (2013.01)
USPC .......... 198/346.1; 198/465.1; 901/16

(58) Field of Classification Search
CPC ........................................................ B23Q 7/08
USPC .................... 901/16, 26; 198/346.1
See application file for complete search history.

(56) References Cited

U.S. PATENT DOCUMENTS

| 4,482,289 | A | * | 11/1984 | Inaba et al. | 414/736 |
|---|---|---|---|---|---|
| 4,706,796 | A | * | 11/1987 | Chambers | 198/346.1 |
| 4,948,329 | A | * | 8/1990 | Fuse et al. | 414/735 |
| 5,105,647 | A | * | 4/1992 | Maher | 72/405.13 |
| 5,297,483 | A | * | 3/1994 | Kakida et al. | 104/88.02 |
| 5,509,191 | A | * | 4/1996 | Best | 29/722 |
| 5,577,597 | A | * | 11/1996 | Kakida et al. | 198/465.1 |
| 5,835,684 | A | * | 11/1998 | Bourne et al. | 700/255 |
| 6,999,847 | B2 | * | 2/2006 | Barry et al. | 700/213 |
| 8,127,415 | B2 | * | 3/2012 | Kipping et al. | 29/38 R |
| 8,282,333 | B2 | * | 10/2012 | Oda et al. | 414/591 |
| 8,498,745 | B2 | * | 7/2013 | Umetsu | 700/254 |
| 2008/0271302 | A1 | * | 11/2008 | Betzig et al. | 29/430 |
| 2009/0018690 | A1 | * | 1/2009 | Negre | 700/117 |
| 2009/0132086 | A1 | * | 5/2009 | Hariki et al. | 700/245 |
| 2009/0276999 | A1 |  | 11/2009 | Kipping et al. |  |
| 2012/0011696 | A1 | * | 1/2012 | Hesse et al. | 29/428 |

FOREIGN PATENT DOCUMENTS

| EP | 1225002 | 7/2002 |
|---|---|---|
| JP | 61-114920 | 6/1986 |
| JP | 1-81288 U | 5/1989 |

(Continued)

OTHER PUBLICATIONS

Extended European Search Report for corresponding EP Application No. 11195586.0-2316, Apr. 4, 2012.

(Continued)

*Primary Examiner* — Ramya Burgess
*Assistant Examiner* — Thomas Randazzo
(74) *Attorney, Agent, or Firm* — Mori & Ward, LLP

(57) ABSTRACT

A work system according to embodiments includes a robot and work stations. The robot performs a predetermined work on a workpiece as a work target. The work stations are places where the predetermined work is performed on the workpiece. The robot performs conveying of the workpiece between the work stations.

8 Claims, 11 Drawing Sheets

(56) References Cited

FOREIGN PATENT DOCUMENTS

| | | |
|---|---|---|
| JP | 4-89686 U | 8/1992 |
| JP | 05-023954 | 2/1993 |
| JP | 06-246654 | 9/1994 |
| JP | 08-294883 | 11/1996 |
| JP | 10-094988 | 4/1998 |
| JP | 10-244431 | 9/1998 |
| JP | 2000-006083 | 1/2000 |
| JP | 2008-191823 | 8/2008 |
| JP | 2010-162652 | 7/2010 |
| JP | 2010-184792 | 8/2010 |
| WO | WO 03/080288 | 10/2003 |

OTHER PUBLICATIONS

Japanese Office Action for corresponding JP Application No. 2011-040613, Apr. 23, 2013.

Japanese Decision of a Patent Grant for corresponding JP Application No. 2011-040613, Dec. 10, 2013.

Chinese Office Action for corresponding CN Application No. 201210021668.5, Jul. 18, 2014.

* cited by examiner

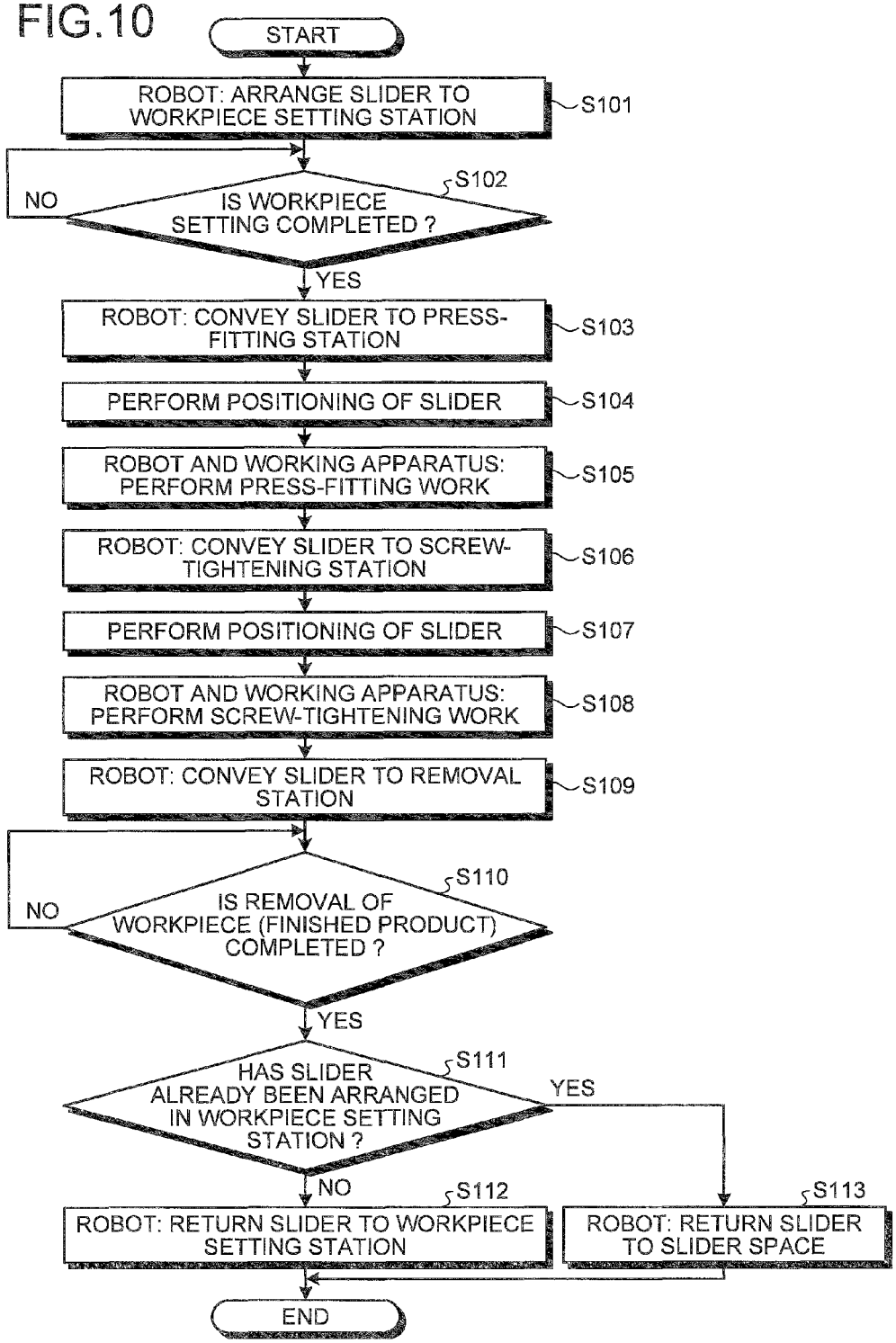

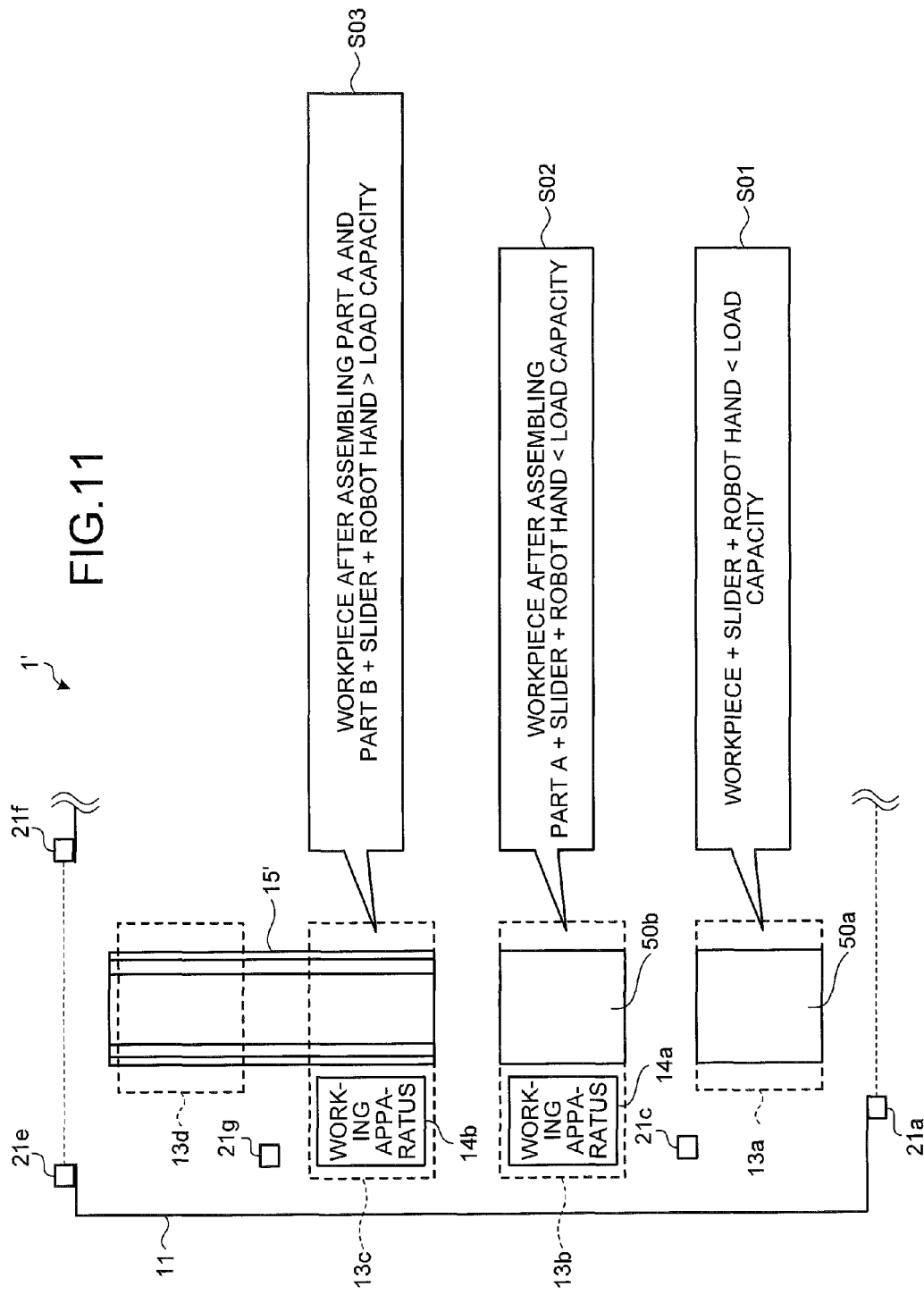

WORK SYSTEM

CROSS-REFERENCE TO RELATED APPLICATION

This application is based upon and claims the benefit of priority of the prior Japanese Patent Application No. 2011-040613, filed on Feb. 25, 2011, the entire contents of which are incorporated herein by reference.

FIELD

The embodiments discussed herein are directed to a work system.

BACKGROUND

Conventionally, there is known a work system that automatically performs works, such as an assembly work and a machining work, which were manually performed, by using an industrial robot and the like.

In this type of the work system, generally, while conveying a workpiece as a work target by a conveying apparatus such as a belt conveyer, a predetermined work is performed by an industrial robot and the like in each work station provided along the conveying apparatus (for example, see Japanese Patent Laid-open Publication No. 2010-162652).

However, when a conveying apparatus such as a belt conveyer is used for conveying a workpiece as in the conventional work system, the equipment cost increases.

SUMMARY

A work system according to an aspect of embodiments includes a robot and a plurality of work stations. The robot performs a predetermined work on a workpiece as a work target. The work stations are places where the predetermined work is performed on the workpiece. The robot performs conveying of the workpiece between the work stations.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic side view of a rail, a slider, and the like;

FIG. 10 is a flowchart illustrating an example of a process procedure performed by the control apparatus; and FIG. 11 is a schematic plan view illustrating a layout of a work system according to a second embodiment.

DESCRIPTION OF EMBODIMENTS

Hereinafter, embodiments of a work system disclosed in the present application will be explained in detail with reference to the accompanying drawings. The present invention is not limited to the embodiments below.

Figure 1A:
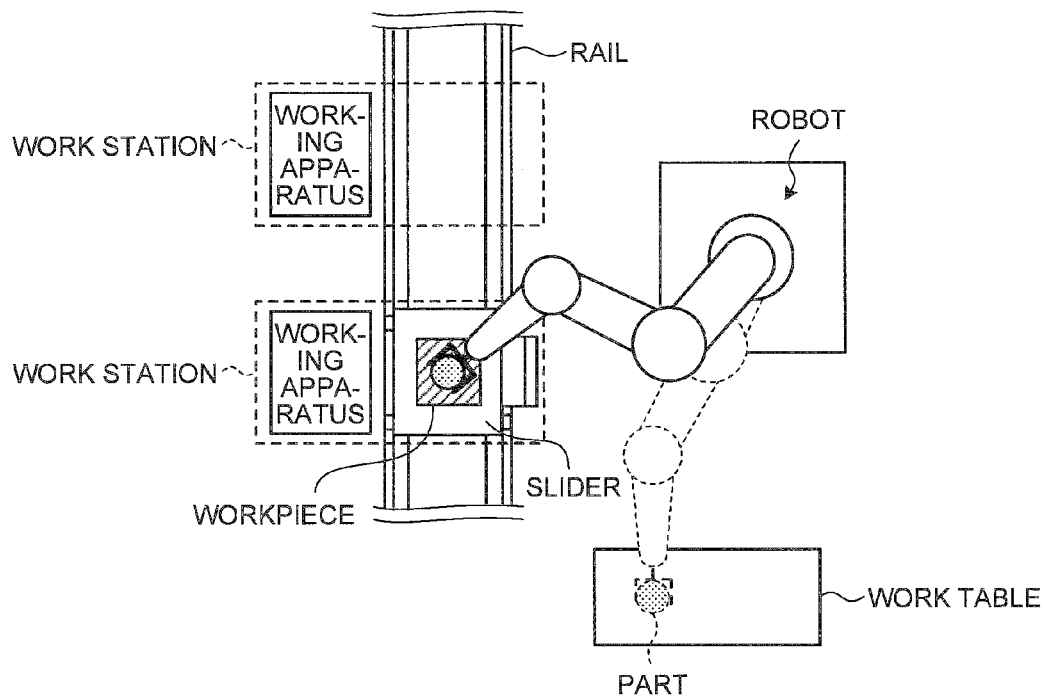
FIG. 1A and FIG. 1B are schematic explanatory diagrams of a work system according to a first embodiment.
Figure 1B:
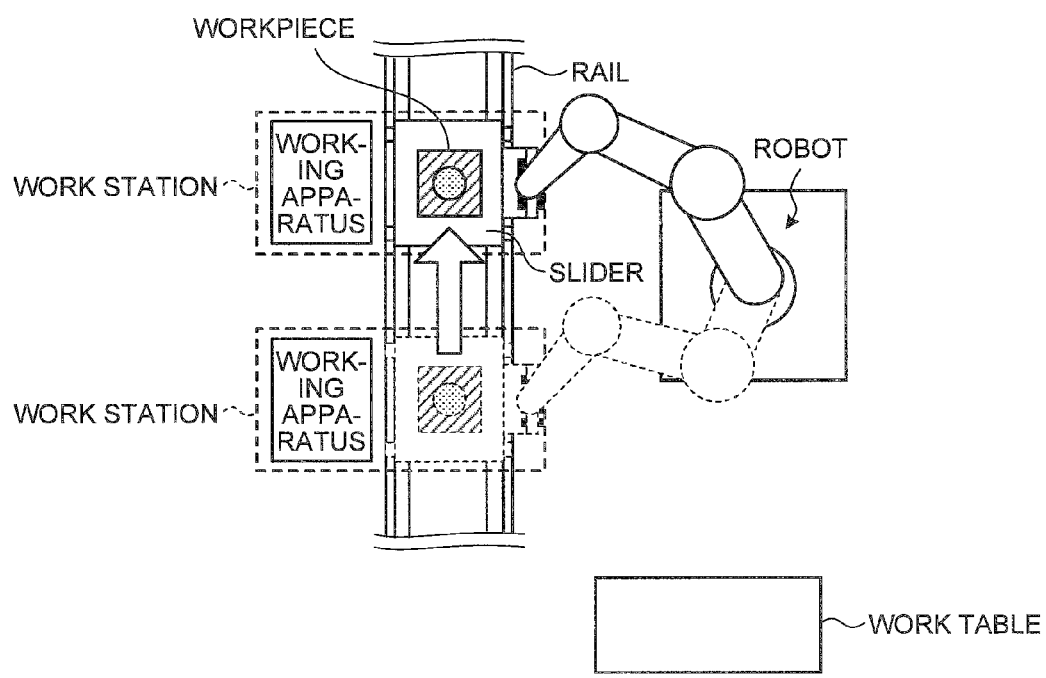

First, a summary of a work system according to a first embodiment is briefly explained with reference to FIG. 1A and FIG. 1B. FIG. 1A and FIG. 1B are schematic explanatory diagrams of the work system according to the first embodiment. As shown in FIG. 1A and FIG. 1B, the work system according to the first embodiment is a system that automatically performs predetermined works on a workpiece as a work target by using a robot and the like.

Specifically, the work system according to the first embodiment includes a robot and a plurality of work stations. The robot is, for example, a single-arm industrial robot. The work station is a place where the predetermined work is performed on a workpiece.

For example, as shown in FIG. 1A, the robot grips a part arranged on a work table and moves the part to a predetermined position in a work station. Then, the robot performs a work of press-fitting the part into a workpiece in corporation with a working apparatus (for example, press-fitting apparatus) arranged in the work station.

In a conventional work system, after a work in one work station is completed, a conveying apparatus, such as a belt conveyer, is used to convey a workpiece to the next work station. However, if a conveying apparatus, such as a belt conveyer, is used, the equipment cost increases. Moreover, the equipment becomes complicated with the use of a conveying apparatus and man-hours required for setting up the equipment, such as electric wiring and equipment adjustment, may increase.

Therefore, in the work system according to the first embodiment, the robot performs conveying of a workpiece between work stations in addition to predetermined works on a workpiece.

For example, as shown in FIG. 1B, after finishing a press-fitting work on a workpiece, the robot conveys the workpiece after the press-fitting work to the next work station. Then, in the next work station, the robot performs a further work (for example, screw tightening work) on the workpiece together with a working apparatus arranged in the work station.

In this manner, the work system according to the first embodiment includes the robot that performs predetermined works on a workpiece as a work target and a plurality of work stations as a place where the predetermined works are performed on a workpiece, and the robot performs conveying of a workpiece between the work stations. Consequently, conveying of a workpiece between the work stations can be performed without additionally providing a conveying apparatus, so that the equipment cost can be suppressed.

Moreover, because the equipment can be simplified by avoiding the use of a conveying apparatus, man-hours required for setting up the equipment, such as electric wiring and equipment adjustment, can be reduced. Therefore, the equipment can be set up in a short time compared with the case of using a conveying apparatus.

As shown in FIG. 1A and FIG. 1B, the work system according to the first embodiment further includes a rail provided along the work stations and a slider that slides on the rail. The robot performs conveying of a workpiece between the work stations by causing the slider, on which a workpiece is placed, to slide on the rail.

In this manner, the robot can convey even a workpiece exceeding a load capacity by conveying the workpiece by using the rail and the slider. Put another way, it becomes possible to convey a workpiece by using a compact robot whose load capacity is relatively small, so that the installation area of the work system can be made small.

Figure 2:
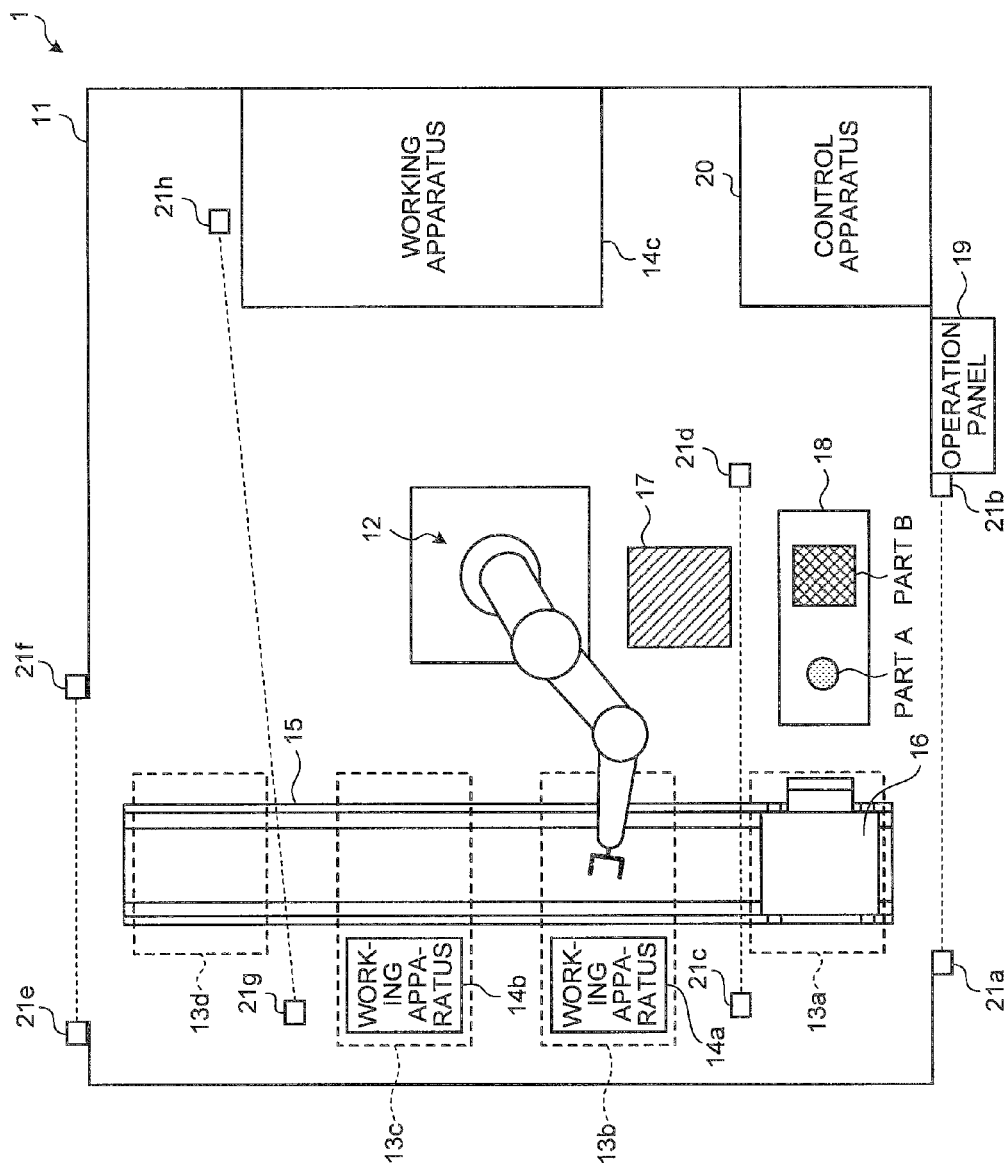
FIG. 2 is a schematic plan view illustrating a layout of the work system according to the first embodiment.

Next, the configuration of the work system according to the first embodiment is specifically explained. First, the layout of the work system according to the first embodiment is explained with reference to FIG. 2. FIG. 2 is a schematic plan view illustrating the layout of the work system according to the first embodiment.

As shown in FIG. 2, a work system 1 includes a cell 11, a robot 12, work stations 13a to 13d, working apparatuses 14a to 14c, a rail 15, a slider 16, a slider space 17, a work table 18, an operation panel 19, a control apparatus 20, and area sensors 21a to 21h.

The cell 11 is a partition frame arranged to surround the work area of the robot 12. The cell 11 is arranged to surround elements other than the operation panel 19 and the area sensors 21a, 21b, 21e, and 21f.

Moreover, the cell 11 includes openings between the area sensors 21a and 21b and between the area sensors 21e and 21f. A worker sets a workpiece and a part through the opening formed between the area sensors 21a and 21b and removes a workpiece (finished product) through the opening formed between the area sensors 21e and 21f. In the followings, the opening formed between the area sensors 21a and 21b is called an "inlet" and the opening formed between the area sensors 21e and 21f is called an "outlet".

The robot 12 is a single-arm industrial robot that performs predetermined works on a workpiece and is arranged approximately in the center of the cell 11. The configuration of the robot 12 is described later with reference to FIG. 4.

The work stations 13a to 13d are places where predetermined works are performed on a workpiece. The work stations 13a to 13d are arranged linearly from the inlet toward the outlet of the cell 11.

In the first embodiment, the work station 13a is a work station where a worker sets a workpiece and the work station 13b is a work station where the press-fitting work of a part A into a workpiece is performed. Moreover, in the first embodiment, the work station 13c is a work station where a screw tightening work of a workpiece and a part B is performed and the work station 13d is a work station from which a worker removes a workpiece (finished product).

In the followings, the work stations 13a to 13d are called a "workpiece setting station", a "press-fitting station", a "screw-tightening station", and a "removal station", respectively, in some cases.

Although omitted in FIG. 2, a clamp unit is provided in each of the work stations 13a to 13d for locking the slider 16 to be described later. The clamp unit is described later with reference to FIG. 3.

The working apparatuses 14a and 14b are apparatuses arranged in the work stations 13b and 13c, respectively, and perform works on a workpiece together with the robot 12. For example, the working apparatus 14a is a press-fitting apparatus that performs the press-fitting work on a workpiece. A screwing tool, such as an electric screwdriver, for performing the screw-tightening work on a workpiece is detachably provided at a predetermined position near the working apparatus 14b.

The working apparatus 14c is an apparatus that machines a part and is arranged in a place other than the work stations 13a to 13d. For example, the working apparatus 14c is a polishing apparatus for polishing the part A. In the followings, explanation of a work performed by using the working apparatus 14c is omitted for easy understanding of the explanation.

The rail 15 is a linear rail arranged along the work stations 13a to 13d. The slider 16 is a moving body slidable along the longitudinal direction of the rail 15, and a work is placed on the base portion of the slider 16.

Figure 3:
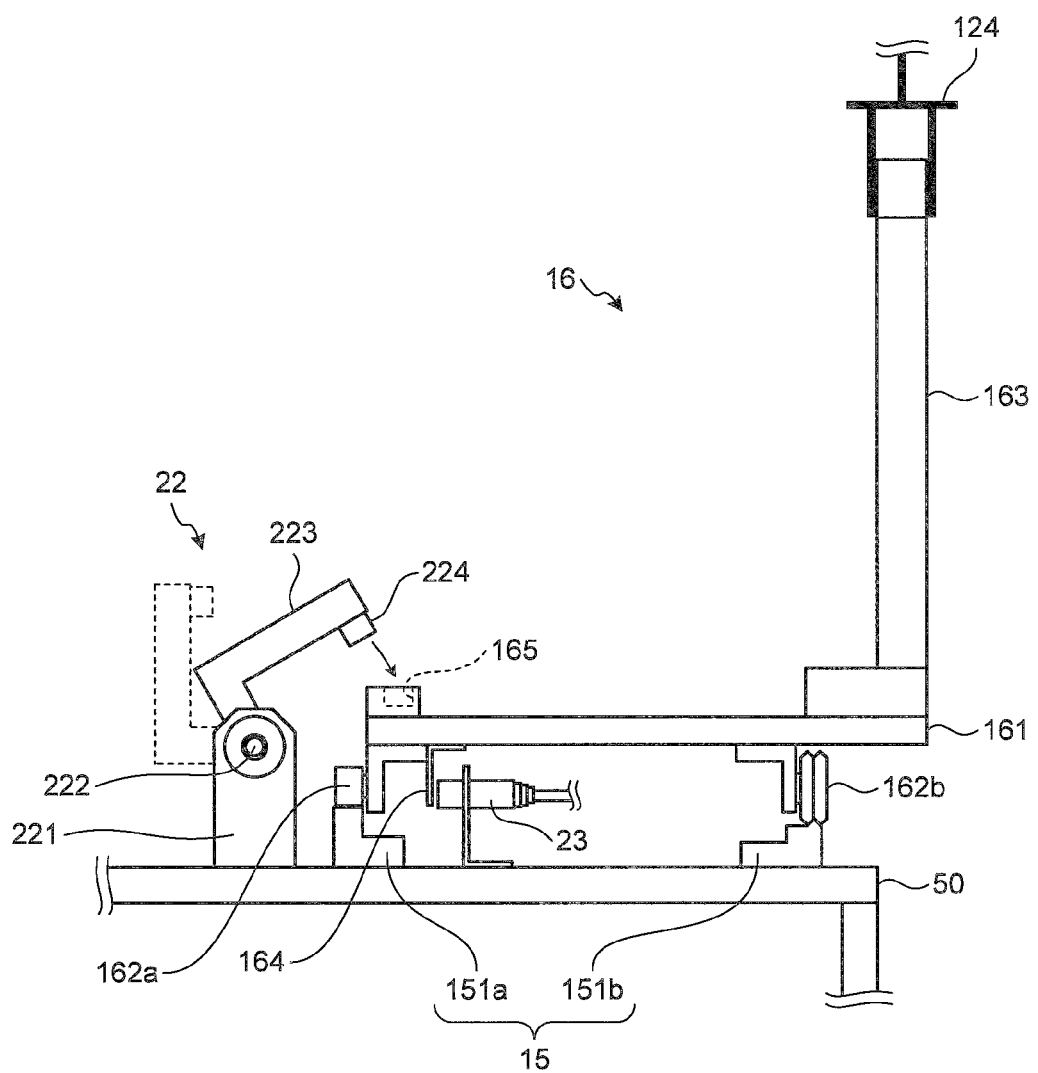

The configuration of the rail 15, the slider 16, and the like is explained with reference to FIG. 3. FIG. 3 is a schematic side view of the rail 15, the slider 16, and the like.

As shown in FIG. 3, the rail 15 includes two rail members 151a and 151b arranged on a work table 50 with a predetermined interval therebetween. The interval between the rail members 151a and 151b can be appropriately changed according to the shape and the size of a workpiece to be a work target.

The slider 16 includes a base 161, wheels 162a and 162b, a handle 163, and an engaging recess 165. The base 161 is a base on which a workpiece is placed. The wheels 162a and 162b are wheels arranged in a portion below the base 161 to match the interval between the rail members 151a and 151b and are in contact with the rail members 151a and 151b, respectively. Consequently, the slider 16 can slide along the rail 15.

The handle 163 is a plate-shaped member projecting upward from the upper surface of the base 161. The robot 12 grips the tip end of the handle 163 by using a robot hand 124 attached to the tip end of the robot arm.

A detection plate 164 is a metal plate, such as an iron plate, provided to project from the lower surface of the base 161 and is provided for detecting the slider 16 by using a proximity sensor 23 to be described later. The proximity sensor 23 is a metal sensor and detects the slider 16 by detecting the detection plate 164.

The engaging recess 165 is a recess formed in the upper surface of the base 161. The engaging recess 165 is engaged with an engaging projection 224 of a clamp unit 22 to be described later, so that the slider 16 is locked.

The clamp unit 22 and the proximity sensor 23 are provided on the work table 50. The clamp unit 22 is a locking mechanism for locking the slider 16 and is provided at a predetermined position of each of the work stations 13a to 13d. Specifically, the clamp unit 22 includes a base part 221, a shaft part 222, a hook part 223, and the engaging projection 224.

The base part 221 is a base member fixed to the upper surface of the work table 50. The shaft part 222 is a rotation shaft extending along the longitudinal direction of the rail 15 and is attached to the base part 221. The hook part 223 is an L-shaped member attached to the shaft part 222. The engaging projection 224 is a projecting member formed at the tip end of the hook part 223.

In the clamp unit 22, the hook part 223 attached to the shaft part 222 is rotated by rotating the shaft part 222, thereby causing the engaging projection 224 formed at the tip end of the hook part 223 to engage with the engaging recess 165 of the slider 16. Consequently, the slider 16 is locked at a predetermined position at each of the work stations 13a to 13d.

The proximity sensor 23 is a metal sensor that detects the slider 16 conveyed along the rail 15 and is arranged between the rail members 151a and 151b. The proximity sensor 23 is arranged in each of the work stations 13a to 13d.

The proximity sensor 23 detects the slider 16 by detecting the detection plate 164 provided in the slider 16. For example, the proximity sensor 23 includes a detection coil that generates a high frequency magnetic field. When the detection plate 164 approaches a high frequency magnetic field, induced current flows in the detection plate 164 by electromagnetic induction. Consequently, the impedance of the detection coil changes due to the induced current and oscillation stops. The proximity sensor 23 detects the detection plate 164, that is, the slider 16, with the stop of the oscillation as a trigger.

Returning to FIG. 2, the layout of the work system 1 is explained. The slider space 17 is a base for placing the slider 16 not in use. For example, the slider space 17 is arranged near the most upstream work station 13*a*. In the slider space 17, the proximity sensor 23 (not shown) is provided, and the control apparatus 20 can specify whether the slider 16 is placed in the slider space 17 by the proximity sensor 23.

The work table 18 is a base for arranging the part A and the part B to be assembled to a workpiece. The work table 18 is provided at a position near the inlet of the cell 11. The part A and the part B are arranged by a worker.

The operation panel 19 is an operating unit attached to the outside of the cell 11. The operation panel 19 is an operating unit that receives various operations related to the work system 1 and notifies the control apparatus 20 of the received operation. For example, on the operation panel 19, there are a setting completion button pressed by a worker after setting of a workpiece and the parts A and B is completed, a removal completion button pressed by a worker after removal of a workpiece (finished product) is completed, and the like in addition to a work start button. In the operation panel 19, an emergency stop button of the work system 1 and the like are also provided.

The control apparatus 20 is a control apparatus for the whole work system 1 including the robot 12 and the working apparatuses 14*a* to 14*c*. The configuration of the control apparatus 20 is described later with reference to FIG. 4.

The area sensors 21*a* to 21*h* are sensors for detecting intruders arranged at the ports and the like of the cell 11 for preventing a worker from being endangered. Specifically, the area sensors 21*a*, 21*c*, 21*e*, and 21*g* are light projecting units and the area sensors 21*b*, 21*d*, 21*f*, and 21*h* are light receiving units corresponding to the area sensors 21*a*, 21*c*, 21*e*, and 21*g*, respectively. When the optical path formed between the light projecting unit and the light receiving unit is blocked, the area sensors detect entry of an object and transmit a detection signal to the control apparatus 20.

The area sensors 21*a* and 21*b* are arranged on both sides of the inlet of the cell 11. Moreover, the area sensors 21*c* and 21*d* are provided inwardly of the area sensors 21*a* and 21*b* in the cell 11. Specifically, the area sensors 21*c* and 21*d* are arranged at positions to sandwich the work station 13*a* and the work table 18 with the area sensors 21*a* and 21*b*. In other words, the work station 13*a* and the work table 18 are positioned between the area sensors 21*a* and 21*b* and the area sensors 21*c* and 21*d*.

The area sensors 21*e* and 21*f* are arranged on both sides of the outlet of the cell 11. Moreover, the area sensors 21*g* and 21*h* are provided inwardly of the area sensors 21*e* and 21*f* in the cell 11. Specifically, the area sensors 21*g* and 21*h* are arranged at positions to sandwich the work station 13*d* with the area sensors 21*e* and 21*f*. In other words, the work station 13*d* is positioned between the area sensors 21*e* and 21*f* and the area sensors 21*g* and 21*h*.

In the followings, the portions between the area sensors 21*a* and 21*b* and between the area sensors 21*e* and 21*f* are called first boundary portions and the portions between the area sensors 21*c* and 21*d* and between the area sensors 21*g* and 21*h* are called second boundary portions in some cases.

In this embodiment, entry of an object is detected by using the area sensors including the light projecting unit and the light receiving unit, however, it is not limited thereto, and a different sensor may be used as long as the sensor can detect entry of an object to the first boundary portions and the second boundary portions. For example, it is possible to use an infrared ray sensor that operates by detecting the ambient temperature change.

Figure 4:
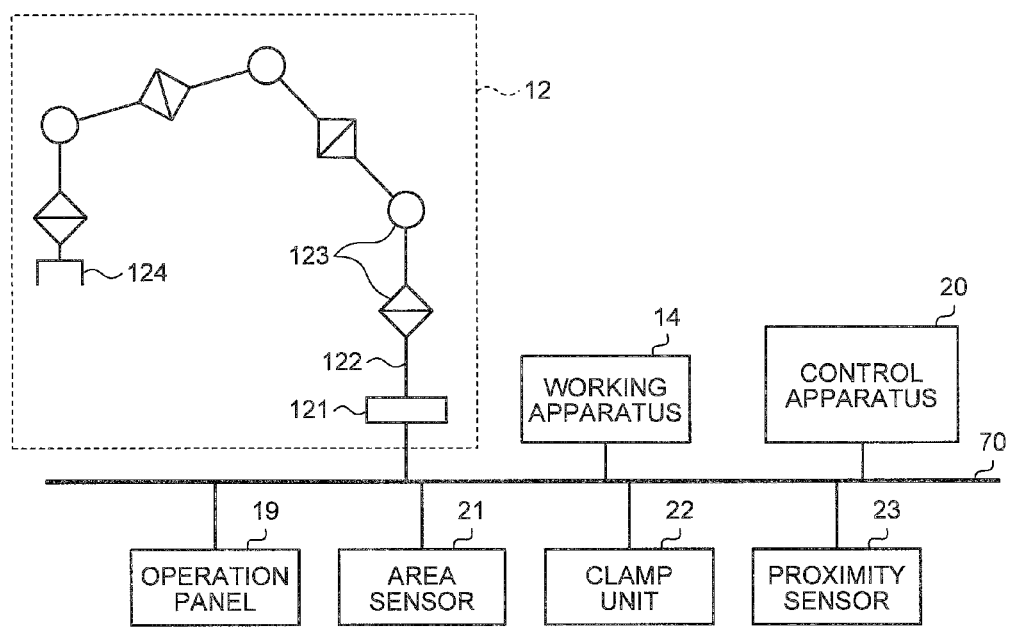
FIG. 4 is a diagram illustrating a network configuration of the work system according to the first embodiment.

Next, the network configuration of the work system 1 is explained with reference to FIG. 4. FIG. 4 is a diagram illustrating the network configuration of the work system according to the first embodiment. In the followings, an arbitrary work station among the work stations 13*a* to 13*d* is simply called a "work station 13", an arbitrary working apparatus among the working apparatuses 14*a* to 14*c* is simply called a "working apparatus 14", and an arbitrary area sensor among the area sensors 21*a* to 21*h* is simply called an "area sensor 21" in some cases to make the explanation easy.

As shown in FIG. 4, the control apparatus 20 is connected to the robot 12, the working apparatus 14, the operation panel 19, the area sensor 21, the clamp unit 22, and the proximity sensor 23 via a network 70. As the network 70, a general network, such as a wired LAN (Local Area Network) and a wireless LAN, can be used.

The control apparatus 20 performs operation control of the robot 12, the working apparatus 14, the clamp unit 22, and the like based on the operation information received from the operation panel 19, the detection result of the proximity sensor 23, and the like. Moreover, the control apparatus 20 performs on/off control of the area sensor 21 according to the working situation of the robot 12.

The configuration of the robot 12 is explained. The robot 12 is fixed, for example, to a floor via a base part 121. Moreover, the robot 12 includes a plurality of robot arms 122 and each robot arm 122 is connected to a different robot arm 122 via a joint 123 including a servo motor.

The joints 123 shown in FIG. 4 are indicated by a "circle" and a "rhomboid" for expressing the difference in the direction of a rotation axis. For example, the joint 123 indicated by a "circle" rotates to change an angle between the robot arms 122 on both sides and the joint 123 indicated by a "rhomboid" rotates while maintaining an angle between the robot arms 122 on both sides.

Among the robot arms 122 connected to each other via the joints 123, the tip end of the robot arm 122 closest to the base part 121 is fixed to the base part 121 and the robot hand 124 is connected to the tip end of the robot arm 122 farthest from the base part 121. The robot hand 124 is an end effector that grips an object. The robot hand 124 and the slider 16 are designed so that the total mass thereof does not exceed the load capacity of the robot 12.

The robot 12 moves the robot hand 124 to an arbitrary position by individually rotating each servo motor by an arbitrary angle according to an instruction from the control apparatus 20.

In this embodiment, the robot 12 is a robot having joints of seven axes, however, the number of joints of the robot 12 is not limited to seven axes.

Figure 5:
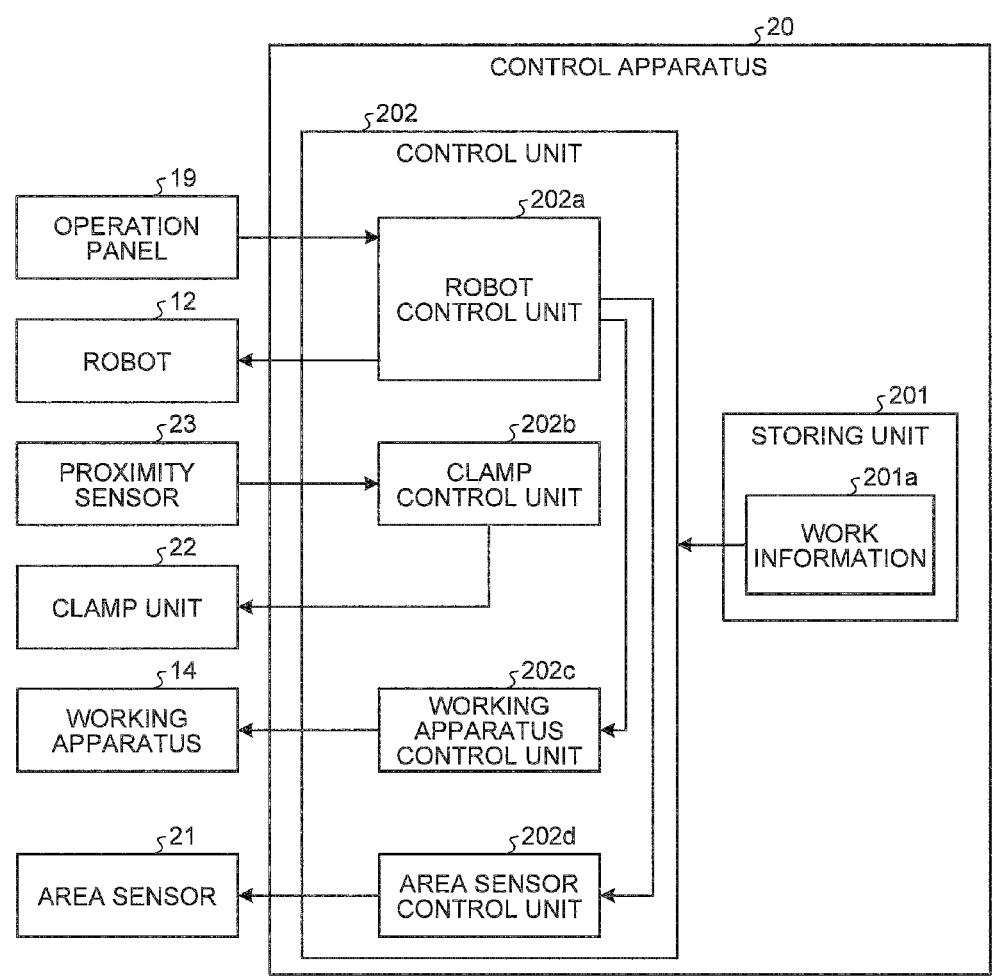
FIG. 5 is a block diagram illustrating a configuration of a control apparatus according to the first embodiment.

Next, the configuration of the control apparatus 20 is explained with reference to FIG. 5. FIG. 5 illustrates only components necessary for explaining the characteristics of the control apparatus 20 and omits description of general components.

As shown in FIG. 5, the control apparatus 20 includes a storing unit 201 and a control unit 202. The storing unit 201 stores therein work information 201*a*. The control unit 202 includes a robot control unit 202a, a clamp control unit 202b, a working apparatus control unit 202c, and an area sensor control unit 202d.

The storing unit 201 is a storing unit composed of a storage device, such as a nonvolatile memory and a hard drive disk, and stores therein the work information 201a. The work information 201a is information such as a work content to be performed on the robot 12, the working apparatus 14, and the like in the work system 1 and work conditions. The control unit 202 controls the robot 12, the working apparatus 14, and the like based on this work information 201a.

The control unit 202 is a control unit that performs overall control of the control apparatus 20. The robot control unit 202a is a processing unit that performs operation control of the robot 12 based on the operation information received from the operation panel 19 and the work information 201a stored in the storing unit 201.

The robot control unit 202a always monitors a current position of the robot 12, progress of a work, and the like. The monitoring result is output to the working apparatus control unit 202c and the area sensor control unit 202d.

The clamp control unit 202b is a processing unit that, upon receiving a detection signal of the slider 16 from the proximity sensor 23, performs drive control of the clamp unit 22 arranged in the work station 13 same as the proximity sensor 23.

For example, when the slider 16 is conveyed to the work station 13b, the proximity sensor 23 arranged in the work station 13b detects the slider 16. In this case, the clamp control unit 202b drives the clamp unit 22 arranged in the work station 13b. Consequently, the engaging projection 224 of the clamp unit 22 is engaged with the engaging recess 165 of the slider 16 and therefore the slider 16 is locked at a predetermined position of the work station 13b (see FIG. 3).

In the first embodiment, explanation is given for a case of driving the clamp unit 22 when the proximity sensor 23 detects the slider 16, however, it is not limited thereto. For example, when the clamp control unit 202b receives a clamp command from the robot 12 and the proximity sensor 23 detects the slider 16, the clamp control unit 202b may drive the clamp unit 22. Moreover, when the clamp control unit 202b receives a clamp command from the robot 12, if the proximity sensor 23 does not detect the slider 16, the clamp control unit 202b may determine as abnormal and perform an abnormality countermeasure processing of, for example, sounding an alarm. In this manner, the clamp control unit 202b may use the detection result of the proximity sensor 23 for confirming the location of the slider 16.

When the work in the work station 13 is completed, the clamp control unit 202b drives the clamp unit 22 and releases the engagement between the engaging projection 224 of the clamp unit 22 and the engaging recess 165 of the slider 16. Consequently, the slider 16 is ready to move to the next work station 13.

The working apparatus control unit 202c is a processing unit that performs operation control of the working apparatus 14 based on the working situation of the robot 12 and the work information 201a stored in the storing unit 201. For example, in a state where the slider 16 is located in the work station 13b, when the working apparatus control unit 202c receives a notification indicating that the robot 12 grips the part A and moves it to a predetermined position from the robot control unit 202a, the working apparatus control unit 202c causes the working apparatus 14a to start the press-fitting work.

The area sensor control unit 202d is a processing unit that performs on/off control of the area sensor 21 according to the working situation of the robot 12. An operation example of the area sensor control unit 202d is described later with reference to FIGS. 9A and 9B.

The above-described control apparatus 20 can be, for example, composed of a computer. In this case, the control unit 202 is a CPU (Central Processing Unit) and the storing unit 201 is a memory. Each function of the control unit 202 can be realized by loading a program generated in advance to the control unit 202 and executing it.

Figure 6A:
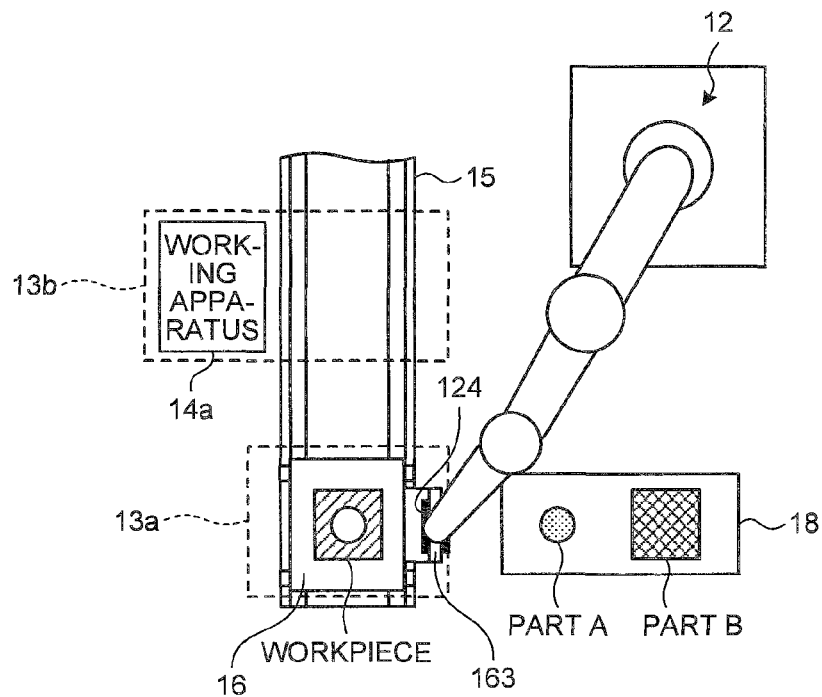
FIG. 6A and FIG. 6B are diagrams illustrating an operation example of a conveying operation by a robot.
Figure 6B:
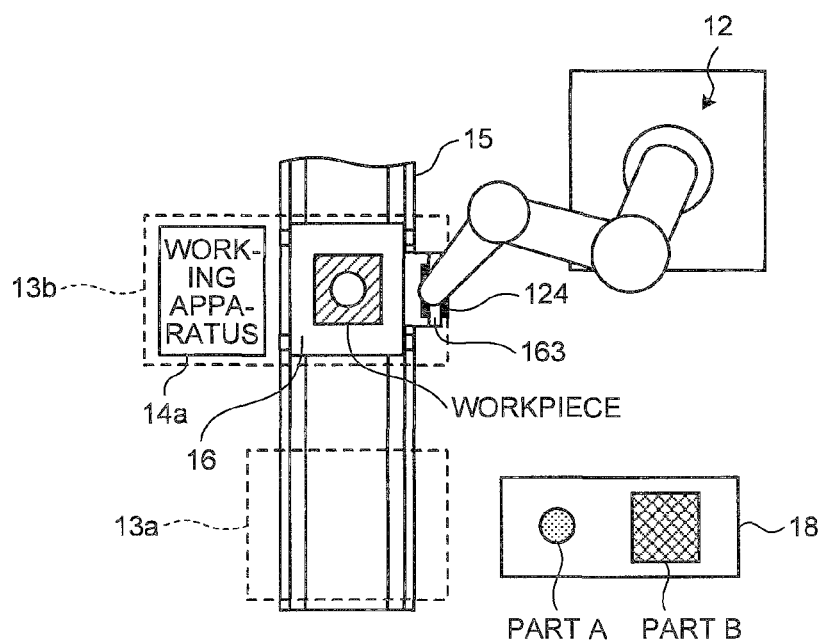

Next, an operation example of the robot 12 is explained. In the first embodiment, the robot 12 performs conveying of a workpiece between the work stations 13 in addition to predetermined works on a workpiece. First, the conveying operation of the robot 12 is explained with reference to FIGS. 6A and 6B. FIGS. 6A and 6B are diagrams illustrating an operation example of the conveying operation by the robot.

As shown in FIG. 6A, a workpiece is placed on the slider 16 and the part A and the part B are placed on the work table 18, and setting of the workpiece and the parts is performed by a worker. When setting of the workpiece and the parts is completed, a worker presses the "setting completion button" provided on the operation panel 19 to start the works of the robot 12, the working apparatus 14, and the like.

When the "setting completion button" is pressed by a worker, the robot 12 conveys the slider 16 to the work station 13b (press-fitting station) according to an instruction from the robot control unit 202a. Specifically, after gripping the tip end of the handle 163 of the slider 16 by the robot hand 124 (see FIG. 6A), the robot 12 moves the slider 16 to the work station 13b while sliding the slider 16 on the rail 15 (see FIG. 6B).

When the robot 12 moves the slider 16 to a predetermined position in the work station 13b, the proximity sensor 23 arranged in the work station 13b detects the slider 16 and the clamp unit 22 arranged in the work station 13b locks the slider 16.

Figure 7A:
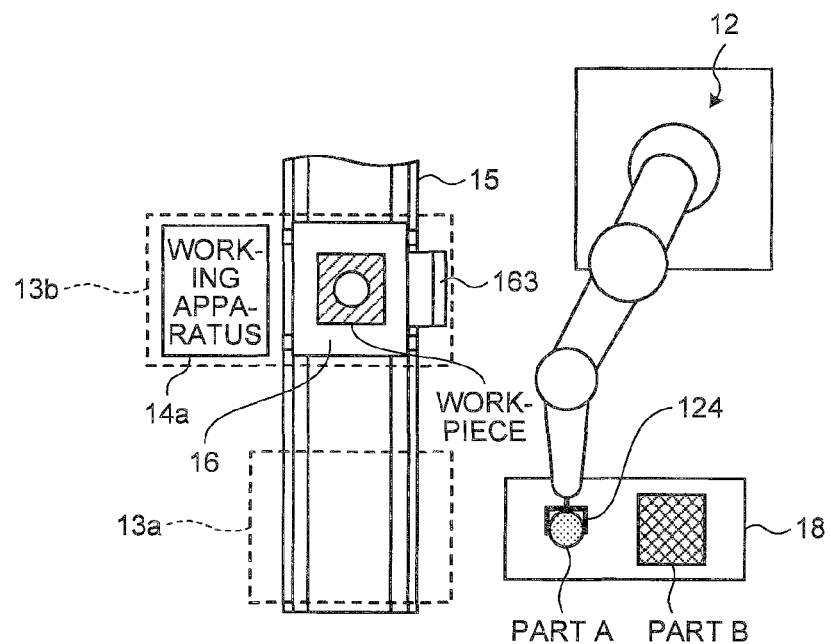
FIG. 7A and FIG. 7B are diagrams illustrating an operation example of a work operation by a robot.
Figure 7B:
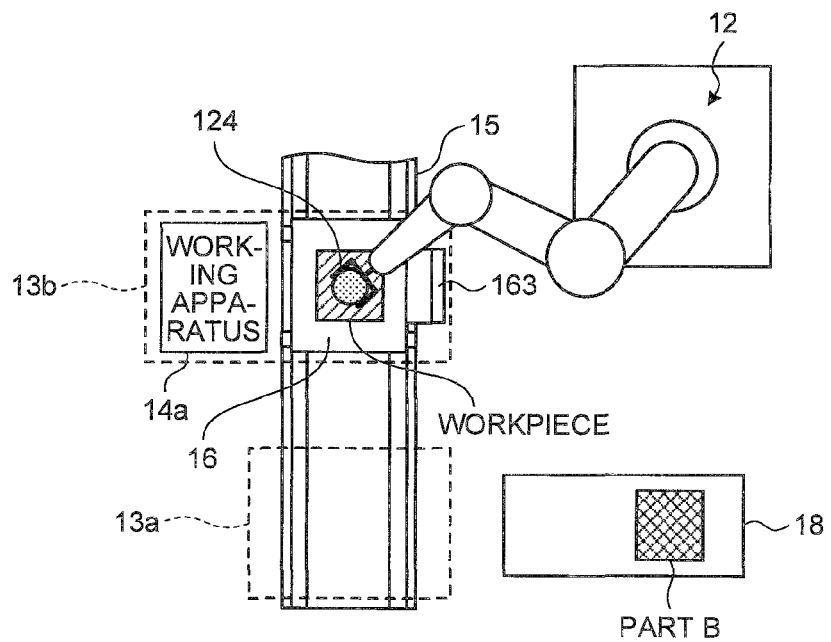

Next, the work operation of the robot 12 is explained with reference to FIGS. 7A and 7B. FIGS. 7A and 7B are diagrams illustrating an operation example of the work operation by the robot.

As shown in FIG. 7A, when the robot 12 conveys the slider 16 to the work station 13b, the robot 12 grips the part A placed on the work table 18 by using the robot hand 124. Moreover, as shown in FIG. 7B, the robot 12 moves the gripped part A to a predetermined position in the work station 13b. In this manner, the robot 12 completes the work in the work station 13b by performing positioning of the part A with respect to the workpiece on the slider 16. Thereafter, the working apparatus 14a, which is a press-fitting apparatus, press-fits the part A into the workpiece.

When the press-fitting work in the work station 13b is completed, the clamp unit 22 unlocks the slider 16. Consequently, the slider 16 is ready to move to the next work station 13c. Then, the robot 12 grips the handle 163 of the slider 16 and conveys the slider 16 to the work station 13c as the next work station.

Moreover, after conveying the slider 16 to the work station 13c, the robot 12 grips the part B placed on the work table 18 and places it on the upper surface of the workpiece. Then, after gripping a screwing tool provided at a predetermined position near the working apparatus 14b by the robot hand 124, the robot 12 performs the screw-tightening work of the work and the part B by using the screwing tool. After completing the screw-tightening work, the robot 12 returns the screwing tool to the predetermined position. In this embodiment, a workpiece after being subjected to the screw-tightening work is a finished product.

In this manner, in the work system 1 according to the first embodiment, the robot 12 performs conveying of a workpiece between the work stations 13 in addition to predetermined works on a workpiece. Consequently, conveying of a workpiece between the work stations 13 can be performed without additionally providing a conveying apparatus, so that the equipment cost can be suppressed.

Moreover, in the work system 1 according to the first embodiment, a workpiece is slidably conveyed by using the rail 15 and the slider 16. Therefore, even a workpiece, whose mass exceeds the load capacity of the robot 12, can be conveyed. Put another way, it becomes possible to convey a workpiece by using a compact robot whose load capacity is relatively small, so that the installation area of the work system can be made small.

Moreover, in the work system 1 according to the first embodiment, because the slider 16 is locked at a predetermined position in the work station 13 by using the clamp unit 22 as one example of the locking unit, positioning of the slider 16 can be easily performed. Moreover, displacement of the slider 16 during a work can be prevented from occurring.

Figure 8A:
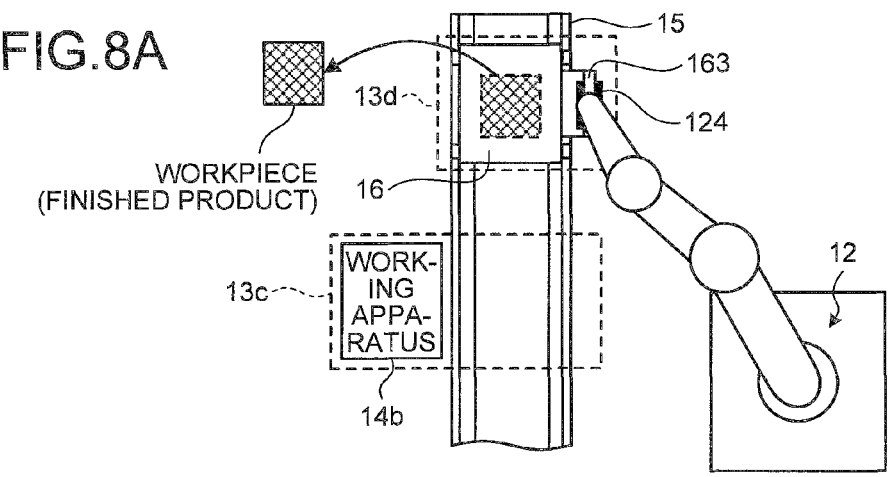
FIG. 8A is a diagram illustrating an operation example of a conveying operation by a robot.
Figure 8B:
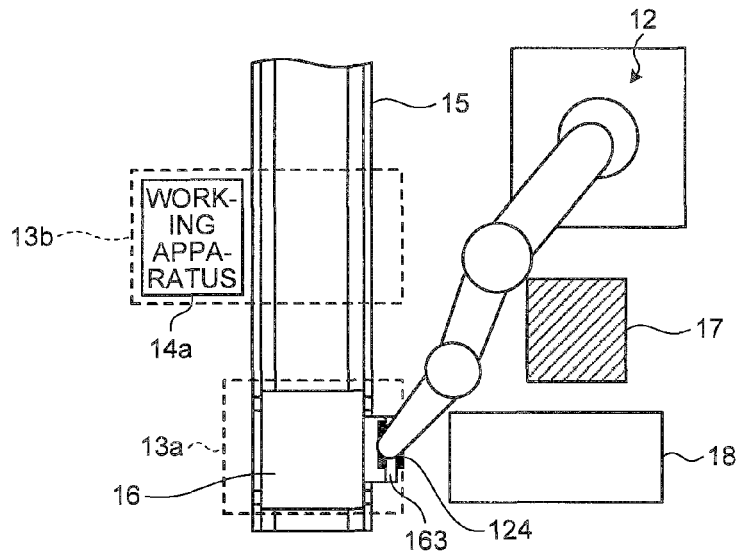
FIG. 8B and FIG. 8C are diagrams illustrating an operation example of a returning operation by a robot.
Figure 8C:
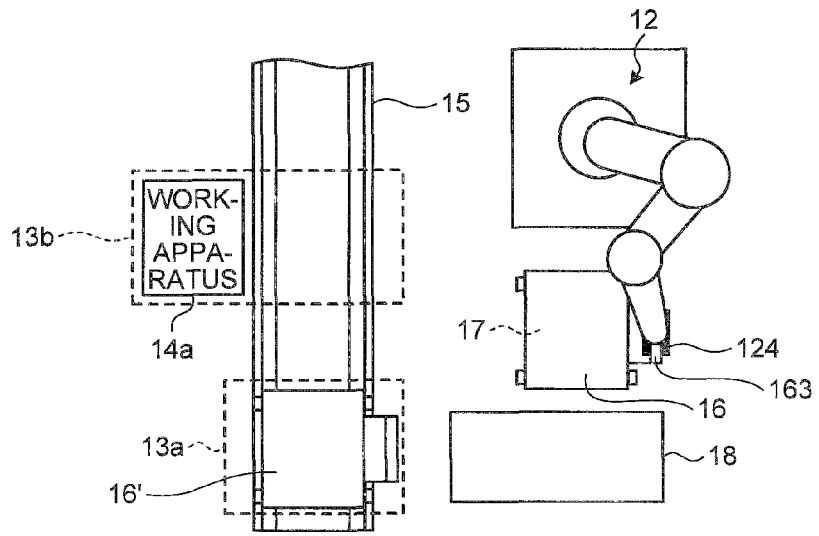

Next, the returning operation of the slider 16 by the robot 12 is explained with reference to FIGS. 8A to 8C. FIG. 8A is a diagram illustrating an operation example of the conveying operation by the robot and FIGS. 8B and 8C are diagrams illustrating an operation example of the returning operation by the robot.

As shown in FIG. 8A, when the screw-tightening work in the work station 13c is completed and the slider 16 locked by the clamp unit 22 is unlocked, after gripping the tip end of the handle 163 of the slider 16 by using the robot hand 124, the robot 12 moves the slider 16 to the work station 13d while sliding it on the rail 15.

When the slider 16 is conveyed to the removal station (the work station 13d), a worker removes a workpiece (finished product). Then, after removing the workpiece (finished product), the worker presses the "removal completion button" of the operation panel 19.

Then, when the "removal completion button" of the operation panel 19 is pressed, the robot 12 starts the returning operation of the slider 16. Specifically, after gripping the tip end of the handle 163 of the slider 16 by using the robot hand 124, the robot 12 moves the slider 16 to the work station 13a that is the most upstream work station (see FIG. 8B).

In this manner, the robot 12 returns the slider 16 conveyed to the most downstream work station 13d to the most upstream work station 13a. Therefore, a worker does not have to perform a work of removing the slider 16 from the most downstream work station 13d and a work of arranging the slider 16 in the most upstream work station 13a, so that a load on a worker can be reduced. Moreover, because the returning operation is performed with the removal of a workpiece (finished product) by a worker as a trigger, the slider 16 does not stay in the most downstream work station 13d and therefore a work can be smoothly performed.

Moreover, the robot 12 returns the slider 16 to the work station 13a without using the rail 15. Specifically, the robot 12 lifts the slider 16 and returns the slider 16 to the work station 13a along the path that does not interfere with the rail 15.

In this manner, in the first embodiment, the path for conveying the slider 16 from the most upstream work station 13a to the most downstream work station 13d and the path for returning the slider 16 conveyed to the most downstream to the most upstream work station 13a are made different, so that a work can be performed on a workpiece efficiently.

When returning the slider 16 to the work station 13a, if another slider 16' is already arranged in the work station 13a, the robot 12 moves the slider 16 to the slider space 17 instead of the work station 13a (see FIG. 8C). With such an operation, a work can be performed on a plurality of (for example, three or more) workpieces in parallel.

If a workpiece is conveyed by using the robot 12 instead of a conveying apparatus such as a belt conveyer, it is needed to perform a work of conveying a workpiece and a part into the cell 11 and a work of conveying a workpiece (finished product) out of the cell 11.

A conveying apparatus that conveys a workpiece and the like into the cell 11 and a conveying apparatus that conveys a workpiece (finished product) out of the cell 11 may be partially arranged, however, arrangement of such conveying apparatuses may result in increase in the equipment cost. On the other hand, it is also considered that a worker conveys a workpiece and the like in and out of the cell 11, for example, by inserting a hand into the cell 11. However, in this case, there is a risk that the worker comes into contact with the robot 12.

Therefore, in the work system 1 according to the first embodiment, the area sensors 21a, 21b, 21e, and 21f arranged at the ports (first boundary portions) of the cell 11 and the area sensors 21c, 21d, 21g, and 21h arranged inside the cell 11 (second boundary portions) are switched on and off according to the working situation of the robot 12, so that a worker can safely enter the cell 11.

Figure 9A:
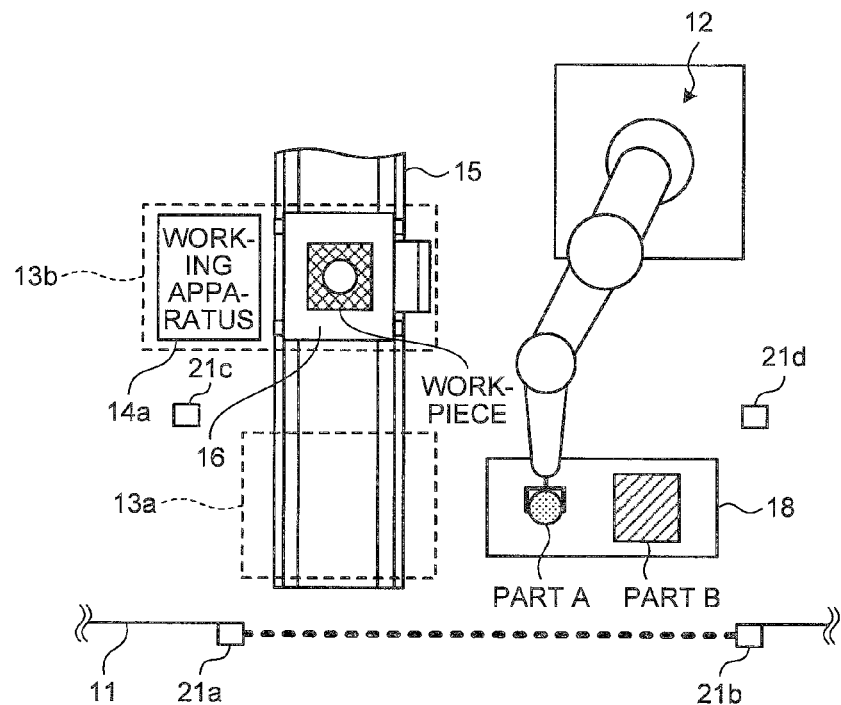
FIG. 9A and FIG. 9B are explanatory diagrams of on/off control of area sensors.
Figure 9B:
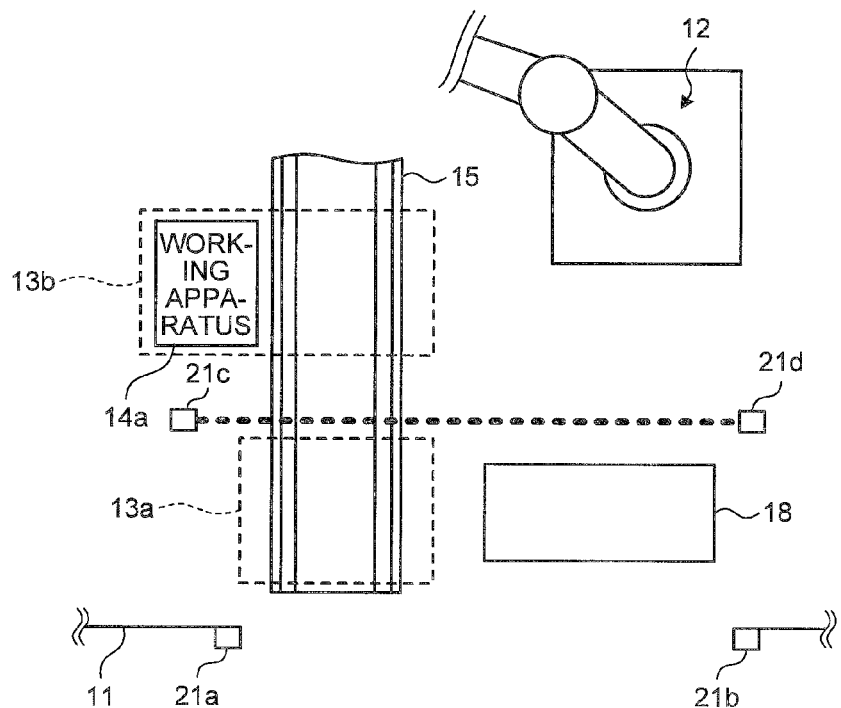

In the followings, on/off control of the area sensors 21a to 21h is explained with reference to FIGS. 9A and 9B. FIGS. 9A and 9B are explanatory diagrams of on/off control of the area sensors 21a to 21d. FIG. 9A illustrates a state where the area sensors 21a and 21b are on and the area sensors 21c and 21d are off. FIG. 9B illustrates a state where the area sensors 21a and 21b are off and the area sensors 21c and 21d are on.

For example, as shown in FIG. 9A, the robot 12 is performing an operation in which the robot 12 may pass over the work table 18 or the work station 13a, such as an operation of gripping the part A and conveying it to the work station 13b by the robot 12. In such a case, the area sensor control unit 202d of the control apparatus 20 sets the area sensors 21a and 21b arranged in the first boundary portion as the port of the cell 11 to an on state and sets the area sensors 21c and 21d arranged in the second boundary portion in the cell 11 to an off state.

In such a state, when a worker enters the cell 11, the area sensors 21a and 21b detect entry of the worker and a safety precaution such as sounding an alarm, is taken by the control apparatus 20. Therefore, the worker can sense danger.

On the other hand, as shown in FIG. 9B, for example, the robot 12 does not return to the place near the inlet of the cell 11 over a predetermined period of time such as a case where the robot 12 performs an operation in a place (for example, the work station 13c) distant from the inlet of the cell 11. In such a case, the area sensor control unit 202d sets the area sensors 21c and 21d arranged in the second boundary portion to an on state and sets the area sensors 21a and 21b arranged in the first boundary portion of the cell 11 to an off state.

Consequently, a worker can enter the cell 11 safely. Specifically, a worker can safely arrange a workpiece and the part A and the part B to the work station 13a or the work table 18.

In this manner, in the work system 1, a first sensor (for example, the area sensors 21a and 21b) is arranged in the first boundary portion as a boundary portion between the cell 11 and the outside and a second sensor (for example, the area sensors 21c and 21d) is arranged in the second boundary portion provided inwardly of the first boundary portion in the cell 11. In the work system 1, the area sensor control unit 202d controls on/off of the first sensor (for example, the area sensors 21a and 21b) and the second sensor (for example, the area sensors 21c and 21d) according to the operation of the robot 12.

Therefore, it is possible to convey a workpiece and a part in the cell 11 and convey a workpiece (finished product) out of the cell 11 safely at low cost.

In this embodiment, on/off control of the area sensors 21a to 21d arranged on the inlet side of the cell 11 is explained as an example, however, on/off control is performed on the area sensors 21e to 21h arranged on the outlet side of the cell 11 in the similar manner.

Next, a specific operation of the control apparatus 20 is explained with reference to FIG. 10. FIG. 10 is a flowchart illustrating an example of a process procedure performed by the control apparatus 20. FIG. 10 illustrates a process procedure until the slider 16 that is conveyed to the removal station (the work station 13d) by the robot 12 is returned after the work start button of the operation panel 19 is pressed. The process procedure of on/off control of the area sensors is omitted in FIG. 10.

As shown in FIG. 10, in the control apparatus 20, when the robot control unit 202a receives a notification indicating that the work start button is pressed from the operation panel 19, the robot control unit 202a instructs the robot 12 to arrange the slider 16 to the workpiece setting station (the work station 13a) (Step S101). The robot 12 grips the slider 16 arranged in the slider space 17 and arranges it on the rail 15 in front of the workpiece setting station (the work station 13a) in accordance with the instruction from the robot control unit 202a.

Next, the robot control unit 202a determines whether workpiece setting by a worker is completed (Step S102). The determination is performed by determining whether a notification indicating that the setting completion button is pressed is received from the operation panel 19. Then, when workpiece setting is not completed (No at Step S102), that is, when a notification indicating that the setting completion button is pressed has not been received from the operation panel 19, the robot 12 is kept on standby.

On the other hand, when the robot control unit 202a determines that workpiece setting is completed (Yes at Step S102), that is, when a notification indicating that the setting completion button is pressed is received from the operation panel 19, the robot control unit 202a instructs to convey the slider 16 to the press-fitting station (the work station 13b) (Step S103).

The robot 12 grips the slider 16 arranged in the workpiece setting station (the work station 13a) and conveys it to the press-fitting station (the work station 13b) in accordance with the instruction from the robot control unit 202a.

When the robot 12 conveys the slider 16 to the press-fitting station (the work station 13b), positioning of the slider 16 is performed in the press-fitting station (the work station 13b) (Step S104). Specifically, the proximity sensor 23 arranged in the press-fitting station (the work station 13b) detects the slider 16 and the clamp unit 22 locks the slider 16.

Next, the robot control unit 202a instructs the robot 12 and the working apparatus control unit 202c instructs the working apparatus 14a to cause the robot 12 and the working apparatus 14a to perform the press-fitting work (Step S105).

When the press-fitting work is completed, the robot control unit 202a instructs to convey the slider 16 to the screw-tightening station (the work station 13c) (Step S106). The robot 12 grips the slider 16 arranged in the press-fitting station (the work station 13b) and conveys it to the screw-tightening station (the work station 13c) in accordance with the instruction from the robot control unit 202a.

When the robot 12 conveys the slider 16 to the screw-tightening station (the work station 13c), positioning of the slider 16 is performed in the screw-tightening station (the work station 13c) (Step S107). Specifically, the proximity sensor 23 arranged in the screw-tightening station (the work station 13c) detects the slider 16 and the clamp unit 22 locks the slider 16.

Next, the robot control unit 202a instructs the robot 12 and the working apparatus control unit 202c instructs the working apparatus 14b to cause the robot 12 and the working apparatus 14b to perform the screw-tightening work (Step S108).

When the screw-tightening work is completed, the robot control unit 202a instructs to convey the slider 16 to the removal station (the work station 13d) (Step S109). The robot 12 grips the slider 16 arranged in the screw-tightening station (the work station 13c) and conveys it to the removal station (the work station 13d) in accordance with the instruction from the robot control unit 202a.

Next, the robot control unit 202a determines whether a workpiece (finished product) is removed (Step S110). The determination is performed by determining whether a notification indicating that the removal completion button is pressed is received from the operation panel 19. Then, when removal of a workpiece (finished product) is not completed (No at Step S110), that is, when a notification indicating that the removal completion button is pressed has not been received from the operation panel 19, the robot 12 is kept on standby.

On the other hand, when the robot control unit 202a determines that removal of a workpiece (finished product) is completed (Yes at Step S110), that is, when a notification indicating that the removal completion button is pressed is received from the operation panel 19, the robot control unit 202a determines whether the slider 16 has been arranged in the workpiece setting station (the work station 13a) (Step S111). The determination is performed by determining whether the proximity sensor 23 arranged in the workpiece setting station (the work station 13a) detects the slider 16.

Then, when the slider 16 has not been arranged in the workpiece setting station (the work station 13a) (No at Step S111), the robot control unit 202a returns the slider 16 conveyed to the removal station (the work station 13d) to the workpiece setting station (the work station 13a) (Step S112) and ends the process.

On the other hand, when the robot control unit 202a determines that the slider 16 has been arranged in the workpiece setting station (the work station 13a) (Yes at Step S111), the robot control unit 202a returns the slider 16 conveyed to the removal station (the work station 13d) to the slider space 17 (Step S113) and ends the process.

As described above, the work system according to the first embodiment includes the robot and the work stations. The robot performs predetermined works on a workpiece as a work target. A plurality of the work stations are places where the predetermined works are performed on a workpiece. The robot conveys a workpiece between the work stations. Therefore, a conveying apparatus for conveying a workpiece does not need to be additionally provided, so that the equipment cost can be suppressed.

Moreover, because the equipment can be simplified by avoiding the use of a conveying apparatus, man-hours required for setting up the equipment, such as electric wiring and equipment adjustment, can be reduced. Therefore, the equipment can be set up in a short time compared with the case of using a conveying apparatus.

Furthermore, in the first embodiment, the robot 12 includes the robot hand 124 that grips an object and performs both predetermined works on a workpiece and conveying of a workpiece by using the robot hand 124. In other words, a workpiece is conveyed without using a special end effector for conveying a workpiece, so that the equipment cost can be further suppressed.

In the first embodiment, the rail 15 is arranged between all of the work stations 13a to 13d. In other words, the slider 16 is conveyed from the most upstream work station 13a to the most downstream work station 13d by using the rail 15, however, it is not limited thereto. For example, the rail 15 may be arranged from the work station 13 in which the total mass of a workpiece, the slider 16, and the robot hand 124 exceeds the load capacity of the robot 12.

In the followings, explanation is given for a second embodiment in a case of determining the arrangement range of the rail 15 according to the mass of a workpiece and the like and the load capacity of the robot 12 with reference to FIG. 11. FIG. 11 is a schematic plan view illustrating a layout of a work system 1' according to the second embodiment. In the following explanation, parts similar to those already described are given the same reference numerals as the parts already described and overlapping explanation is omitted. Moreover, in the followings, a workpiece, the slider 16, and the robot hand 124 are called a "conveying object".

As shown in FIG. 11, the mass of a workpiece increases by assembling the part A to the workpiece in the work station 13b. Moreover, the mass of a workpiece further increases by assembling the part B to the workpiece in the work station 13c. In this manner, the mass of the conveying object increases as the conveying object is conveyed toward the downstream work station 13 from the upstream work station 13.

Assuming that the mass of the conveying object exceed the load capacity of the robot 12 in the work station 13c (see S03 in FIG. 11), the robot 12 cannot convey the conveying object from the work station 13c to the work station 13d without the rail 15.

However, in the work station 13a, the mass of the conveying object, that is, the total mass of a workpiece, the slider 16, and the robot hand 124 does not exceed the load capacity of the robot 12 (see S0l in FIG. 11). In the similar manner, in the work station 13b also, the mass of the conveying object, that is, the total mass of a workpiece after assembling the part A, the slider 16, and the robot hand 124 does not exceed the load capacity of the robot 12 (see SO2 in FIG. 11). Therefore, the robot 12 can convey the conveying object from the work station 13a to the work station 13c without the rail 15.

Therefore, in such a case, a rail 15' may be arranged only between the work station 13c and the work station 13d. In the work stations 13a and 13b in which the rail 15' is not arranged, work tables 50a and 50b are arranged, respectively. It is sufficient that the height of these work tables 50a and 50b is within the operation range of the robot 12 and the height does not need to be the same as the height of the rail 15'.

In this embodiment, the rail 15' is arranged from the work station 13 in which the mass of the conveying object exceeds the load capacity of the robot 12, however, it is not limited thereto. For example, in consideration of the safety and the like, the rail 15' may be arranged from the work station 13 in which the mass of the conveying object exceeds an allowable mass (for example, mass of 70% of the load capacity) based on the load capacity of the robot 12.

As described above, in the second embodiment, the rail 15' is provided along the work station 13 in which the mass of the conveying object exceeds an allowable mass based on the load capacity of the robot 12 and the work station 13 downstream of the work station 13 among the work stations 13a to 13d. Therefore, the equipment cost can be further reduced.

In the first embodiment and the second embodiment described above, the case of using a single-arm robot is explained, however, the type of the robot is not limited to a single-arm robot and may be a dual-arm robot.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A work system comprising:
  a robot that performs a predetermined work on a workpiece as a work target;
  a plurality of work stations that are places where the predetermined work is performed on the workpiece;
  a rail provided along one or more of the work stations; and
  a slider on which the workpiece is placed and which is configured to slide on the rail,
  wherein the robot includes a robot hand that grips an object to perform the predetermined work on the workpiece and to convey the slider by using the robot hand,
  wherein the robot has a load capacity that is a maximum load that the robot is allowed to carry with the robot hand,
  wherein the load capacity is larger than a mass of each of a part assembled into the workpiece, the robot hand, and the slider and is smaller than a total mass of the workpiece into which the part is assembled, the robot hand, and the slider,
  wherein the plurality of work stations includes a predetermined work station, an upstream work station provided upstream of the predetermined work station, and a downstream work station provided downstream of the predetermined work station,
  wherein a mass of a conveying object including the workpiece and the slider does not exceed the load capacity of the robot at the upstream work station, and the mass of the conveying object including the workpiece and the slider does exceed the load capacity of the robot at the predetermined work station and at the downstream work station, and
  wherein the rail is not provided from the upstream work station to the predetermined work station, and the rail is provided along the predetermined work station to the downstream work station.

2. The work system according to claim 1, further comprising a locking unit that locks the slider at a predetermined position in the work stations.

3. The work system according to claim 1, wherein the robot returns the slider conveyed to a most downstream work station to a most upstream work station.

4. The work system according to claim 2, wherein the robot returns the slider conveyed to a most downstream work station to a most upstream work station.

5. The work system according to claim 3, wherein the robot, when a slider is already arranged in the most upstream work station, moves the slider that is conveyed to the most downstream work station to a specific place.

6. The work system according to claim 1, further comprising:
  a first sensor that detects entry of an object in a first boundary portion that is a boundary portion between a predetermined work section including the work stations and the robot and outside;

a second sensor that detects entry of an object in a second boundary portion provided inwardly of the first boundary portion in the predetermined work section; and a sensor control unit that controls on/off of the first sensor and the second sensor according to an operation of the robot.

7. The work system according to claim 1, wherein the load capacity of the robot is smaller than a total mass of a finished workpiece into which parts are assembled, the robot hand, and the slider, and the rail is provided from the predetermined work station to a removal station from which a finished workpiece is removed.

8. The work system according to claim 3, wherein the robot grips and lifts, by using the robot hand, the slider that is conveyed to a most downstream work station, and returns the lifted slider to a most upstream work station along a path that does not interfere with the rail.

* * * * *